G. LITTLEFORD.
FEEDING MECHANISM.
APPLICATION FILED MAR. 1, 1920.
1,390,800.
Patented Sept. 13, 1921.
2 SHEETS—SHEET 2.
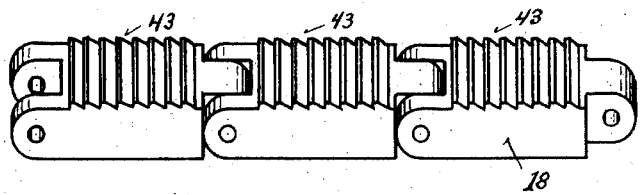
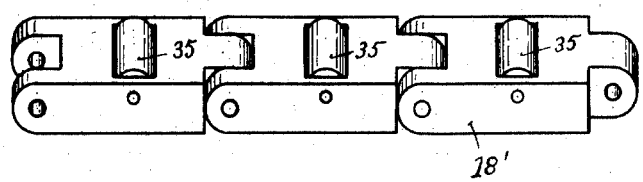
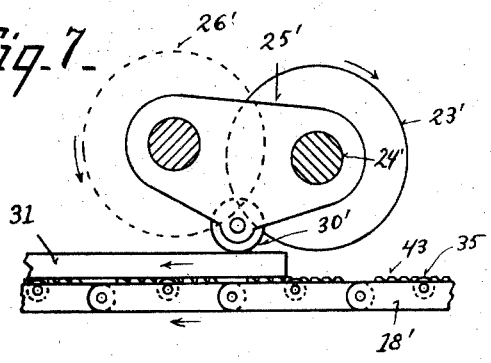
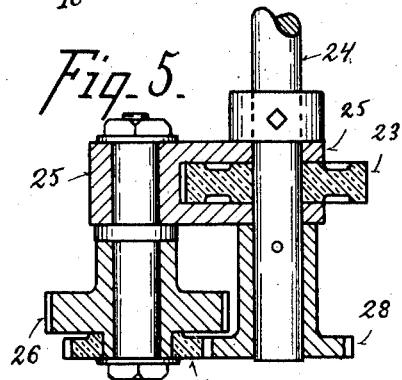
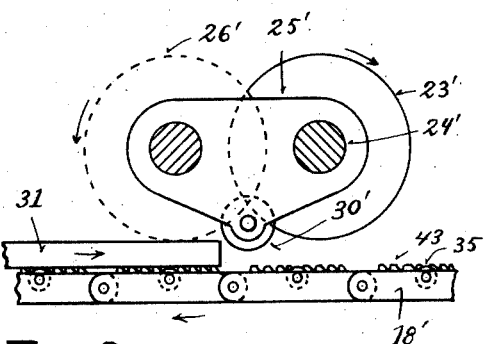
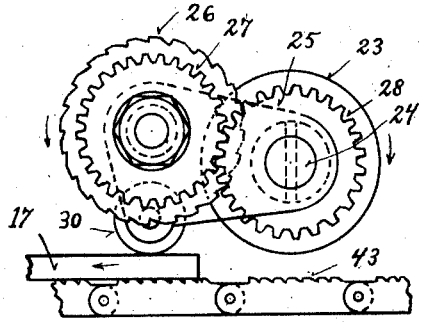
Inventor
George Littleford,
By C. W. Miles,
Attorney

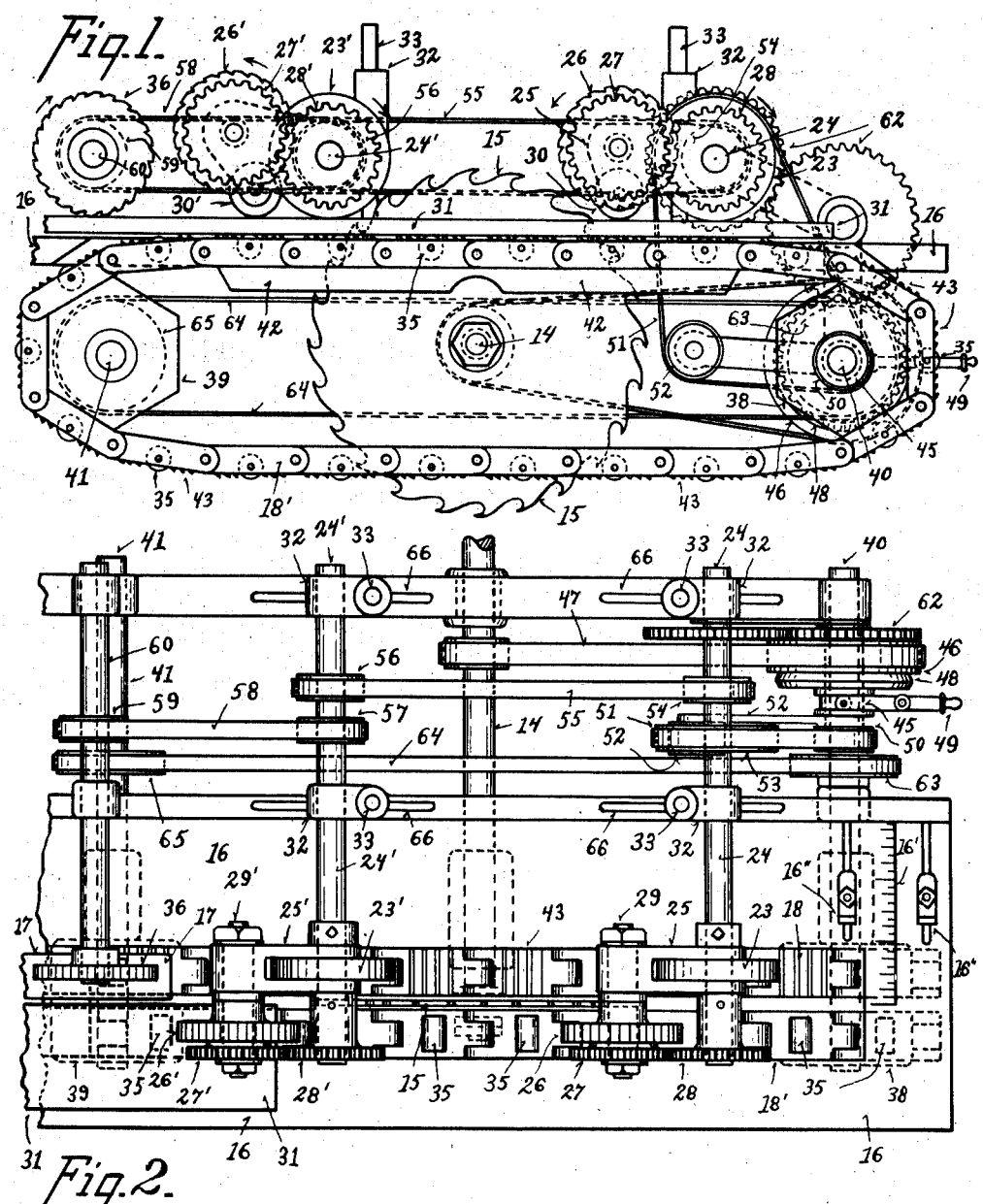

UNITED STATES PATENT OFFICE.

GEORGE LITTLEFORD, OF FORT THOMAS, KENTUCKY.

FEEDING MECHANISM.

1,390,800.      Specification of Letters Patent.      Patented Sept. 13, 1921.

Application filed March 1, 1920. Serial No. 362,468.

*To all whom it may concern:*

Be it known that I, GEORGE LITTLEFORD, a citizen of the United States, residing at Fort Thomas, in the county of Campbell and State of Kentucky, have invented certain new and useful Improvements in Feeding Mechanism, of which the following is a specification.

My invention relates to improvements in feeding mechanism for rip saws and other wood working and similar machines. One of its objects is to provide a feeding mechanism to feed one portion of the stock forward through and away from the saw or other tool, and to automatically return another portion of the stock to the operator at the front of the saw or tool. Another object is to provide improved mechanism whereby the one portion of the stock may be fed uninterruptedly and successively through a plurality of machines without intermediate operators, and another portion of the stock automatically returned to the operator at the forward end of the first tool. Another object is to provide improved automatically operated forward and return feed mechanism. Another object is to provide improved forward and return feed mechanism in which the use of a side gage or guide is obviated. My invention also comprises certain details of form combination and arrangement, all of which will be fully set forth in the description of the accompanying drawings, in which:

Figure 1 is a diagram illustrating a saw and feeding mechanism embodying my invention.

Fig. 2 is a plan of the mechanism of Fig. 1.

Fig. 3 is a perspective view of a portion of the forward feed chain detached.

Fig. 4 is a perspective view of a portion of the return feed chain detached.

Fig. 5 is a sectional detail through one of the return feed mechanisms.

Fig. 6 is a front elevation of the feeding mechanism of Fig. 5 showing its relation to the feed chain.

Fig. 7 is a diagram illustrating the position of the work or stock with reference to the chain and return feed mechanism just prior to the stock sections being severed.

Fig. 8 is a view similar to Fig. 7 showing the relative position of the stock and feed mechanism just after the stock sections have been severed, and when one of said stock sections is about to be fed in a reverse direction.

The accompanying drawings represent the preferred embodiment of my invention, in which 14 represents a mandrel on which may be mounted a saw or other rotary wood working tool 15. This mandrel may be mounted as illustrated below the work table 16, so that the tool will operate from the under side upon the stock or work 17, or the mandrel may be mounted above the work table so as to operate from above upon the stock. A work table is preferably provided for convenience, although the stock rests directly upon a feeding belt or chain 18, and is fed forward to the tool by said chain or belt. If desired the feeding belt may be wholly at one side of the tool, but I preferably arrange the tool and feeding belt so that there will be a section of the belt upon each side of the tool. Where the mandrel is located below the work table, the feeding belt is divided into two separate sections 18 and 18' one upon each side of the tool with the tool engaging the stock through the space between the belt sections. Where the mandrel is located above the stock, a single belt section may be employed if desired and the tool travel at one side thereof or in a groove longitudinally thereof in which the periphery of the tool may travel.

By arranging the feeding belt so as to travel at right angles to the axis of the tool mandrel, the direction of feed of the stock is controlled entirely by the feed belt, and no side guide for the stock is required for certain classes of work. The forward end of the stock is engaged with the feed belt at the desired position with the assistance of a gage or measuring stick 16' marked upon the top of the work table, or supported adjustably upon or above the work table, and after being started correctly into feeding relations with the feed belt, the stock continues to travel forward with the feed belt strictly at right angles to the axis of the tool mandrel. One or more adjustable side guides 16'' may be employed to start the stock truely.

Above the stock, or on the opposite side of the stock from the feed belt and forward of the tool is a roller 23 which serves to force and hold the stock in contact with the face of the feed belt. This roller is mounted upon a shaft 24. The roller 23 may be loosely mounted upon the shaft 24 or it may be keyed to the shaft so as to revolve therewith and assist in positively feeding the stock to the tool. A link 25 is loosely journaled upon the shaft 24, and at its opposite end is provided with a stud shaft 29 rigidly connected thereto and on which is loosely journaled a reverse feed roller 26 to which is attached a spur gear 27. The gear 27 meshes with and is driven in the reverse direction by a gear 28 rigidly mounted upon the shaft 24. The roller 23 is located at one side of the tool while the reverse feed roller 26 is located at the opposite side of the tool. In rear of the tool are similarly mounted and operated forward and reverse feed members 23', 24', 25', 26', 27', 28' and 29'. The outer or free end of the link 25 is provided with an idler roller 30 adapted when no stock is being fed, to ride upon the upper face of the feed belt section 18, and to thereby support the link 25 sufficiently high above the belt so that the reverse feed roller 26 will be out of contact with the feed belt section 18' even when no stock is interposed between them. The link 25' is supported in a similar manner by an idler roller 30', which however is set about midway of the link 25' in order that the reverse feed roller 26' may be lowered upon and engage one of the stock sections 31 before it has passed out of range of the feed roller 26', as indicated in Figs. 7 and 8.

Since the thickness of the stock will vary according to the character of work, the bearings 32 of the shafts 24 and 24' are mounted and vertically adjustable upon vertical posts or guides 33, or in lieu thereof the feed belt may be vertically adjustable to and from the shafts 24 and 24' and the rollers carried thereby until the space between the rollers 23 and 23' and the feed belt is substantially the same as the thickness of the stock to be acted upon. When the stock is fed into the machine its forward end rides under the roller 30 and lifts the link 25 and the reverse feed roller 26, and later engages and lifts the roller 30' and the link 25' and reverse feed roller 26'. As soon as the rear end of the piece of stock has passed the roller 30, said roller 30, link 25 and reverse feed roller 26 are lowered until the reverse feed roller is in position to ride upon the section 31 of the stock and feed it in a reverse direction over the roller 35 carried by the feed belt section 18'. As soon as the stock has been severed by the tool into stock sections 17 and 31, and its rear end has passed the roller 30' the reverse feed roller 26' drops upon the rear end of the first or main stock section 31 and commences to feed it in a reverse direction, that is toward the operator in front of the tool, while the second stock section 17 continues to be fed, as for instance by the feed roller 36, away from the tool 15 and into or toward some other tool or machine not shown to be further acted upon. The stock section 31 is also engaged by the reverse feed roller 26 as soon as it comes in contact therewith, and is thus returned to the operator in front of the tool whereupon he starts it again through the feed mechanism to be again acted upon by the tool and another stock section 17 severed therefrom, until several duplicate stock sections 17 have been produced and fed away from the tool and the stock section 31 has been entirely utilized as far as possible for such purpose. The use of said feed mechanism including the belt insures a positive, reliable and accurate feed of the stock without requiring a side guide, and under many conditions where a side guide could not be satisfactorily employed.

The feed belt is mounted upon two pulleys or sprocket wheels 38 and 39, mounted upon the shafts 40 and 41, and the central upper portion of said feed belt travels along a horizontal guide or support 42 carried rigidly relative to the work table. The belt section 18 is provided with a milled face or series of projections 43 to engage the under face of the stock and insure the stock retaining its position relative to the belt and traveling therewith. The belt section 18' is provided with a series of rollers 35 on which the stock section 31 rests, and by means of which the stock section 31 may be fed in a reverse direction by the positively driven reverse feed rollers 26 and 26' as soon as the stock section 31 has been severed from the stock section 17. Where the belt section 18' is dispensed with, the rollers 35 are mounted in recesses in the face of the work table to operate in substantially the same manner.

Journaled loosely upon the shaft 40 is a sleeve 45 which carries a pulley 46 driven by a belt 47 from the tool mandrel 14. A clutch member 48 is loosely mounted upon the sleeve 45 and adjustable endwise of the shaft 40 by means of a hand lever 49 to engage and disengage the clutch member 48 with the pulley 46. The clutch member 48 carries and drives the pulley 50 which by means of the belt 51 and belt tightener 52 drives the pulley 53 and shaft 24 on which the pulley 53 is rigidly mounted. A pulley 54 on shaft 24 and belt 55 serve to drive the pulley 56 and shaft 24' on which pulley 56 is rigidly mounted. A pulley 57 and belt 58 serve to drive the pulley 59 and shaft 60, which shaft carries and drives the feed roller 36, and serves to automatically feed the stock sections 17 from the tool 15 to be operated upon by another tool or machine without requiring an independent operator to handle the stock sections 17. For this purpose, where it is important the chain or feed belt is preferably extended beneath the feed roller 36 to insure the stock sections entering the second machine in the precise relation to the feed belt in which they left the tool 15. The shaft 40 is driven from the shaft 24 in a reverse direction thereto preferably by means of a train of gears 62. A pulley 63 on the shaft 40 and belt 64 serve to drive the pulley 65 rigidly mounted on the shaft 41. The bearings of the tool mandrel 14 are preferably vertically adjustable to provide for severing thick or thin stock. The posts 33 and bearings 32 are preferably adjustable horizontally upon the guides 66 to adjust the shafts 24 and 24' with their feed rollers nearer to or farther from the tool. Where the tool is mounted above the feed belt, the feed belt sections may be formed integral or connected together with a channel in the face thereof for the passage of the periphery of the tool.

The apparatus herein illustrated and described is capable of considerable modification without departing from the principle of my invention.

What I claim is—

1. In combination with a tool to operate upon the stock, a feed belt means on which the stock is supported and fed past the tool, means to engage the opposite face of the stock from the feed belt means to hold the stock in feeding engagement with the feed belt means, a movably mounted and positively driven reverse feed member to feed a primary stock member back in a reverse direction to an operator as soon as the primary stock member and severed stock member have been severed by the tool, and means actuated by the movements of the severed stock member to shift said reverse feed member into and out of position to engage with said primary stock member.

2. In combination with a stock severing tool, a positively driven feed belt means to feed a severed stock section to and away from said tool, means to automatically continue the forward feed of said severed stock section to the action of another tool, a positively driven return feed member movably mounted and normally in position to engage a first section of the stock to feed it in the opposite direction, and means engaged by said severed stock section to hold said return feed member out of engagement with said first stock section until said first and second stock sections have been severed one from the other.

3. In combination with a tool to operate upon the stock, a feed belt means on which the stock is supported and fed past the tool, means to engage the opposite face of the stock from the feed belt means to hold the stock in feeding engagement with the feed belt means, a movably mounted and positively driven reverse feed member to feed a first stock member back in a reverse direction to an operator as soon as the first and severed stock members have been severed by the tool, and means actuated by the movements of the severed stock member to shift said reverse feed member into and out of position to engage with said first stock member.

4. In combination with a stock severing tool, a feed belt means on which the stock is supported and fed past said severing tool and a severed stock section is fed on away from said severing tool, a movably mounted and positively driven reverse feed member in position to engage the other or primary stock section to feed said primary stock section back to an operator in front of the severing tool, rollers carried by said feed belt means to frictionlessly support said primary stock member for movement in either forward or reverse direction, and means actuated by the movement of the severed stock section to shift said reverse feed member into and out of position to engage with said primary stock section to return the primary stock section to the operator.

5. In combination with a stock severing tool, a feed belt means on which the stock is supported and fed past said severing tool and a severed stock section is feed on away from said severing tool, a movably mounted and positively driven reverse feed member in position to engage the other or primary stock section to feed said primary stock section back to an operator in front of the severing tool, and means actuated by the movement of the severed stock section to shift said reverse feed member into and out of position to engage with said primary stock section, a part of said feed belt means, though continuing its feeding movement, movable to facilitate the reverse feed.

6. In combination with a stock severing tool, a feed belt on which the stock is supported and fed past said severing tool and a second stock section is fed away from said severing tool, a plurality of movably mounted and positively driven reverse feed members in position to engage the opposite or first stock section to feed said first stock section to an operator in front of the severing tool, and means actuated by the movement of said second stock section to shift said reverse feed members into and out of position to engage with said first stock section.

In testimony whereof I have affixed my signature.

GEORGE LITTLEFORD.